(No Model.)
W. POMMERENKE.
COMBINED HARROW AND SEED PLANTER.
No. 337,991. Patented Mar. 16, 1886.
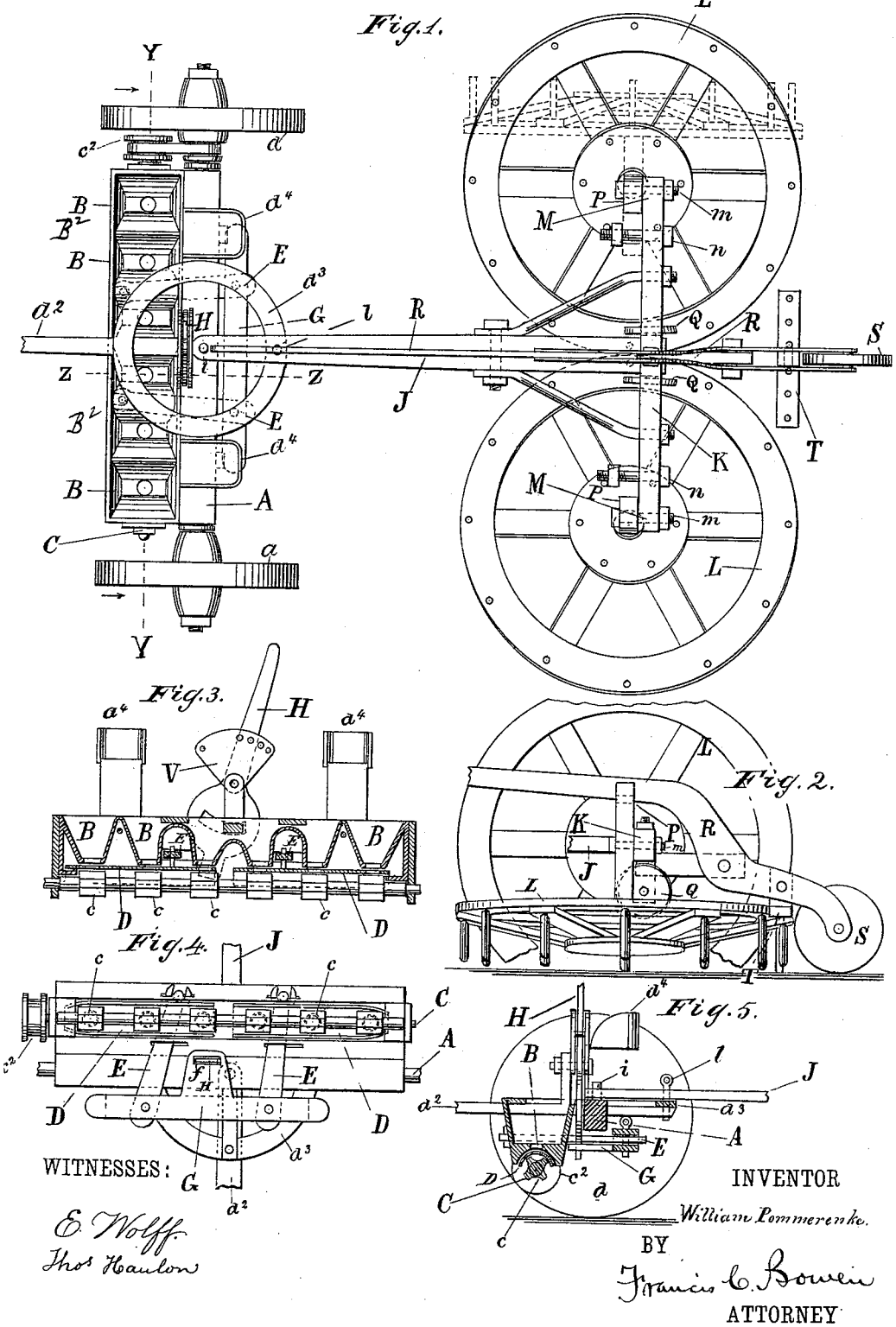
WITNESSES:
E. Wolff
Thos Hanlon
INVENTOR
William Pommerenke.
BY
Francis C. Bowen
ATTORNEY

UNITED STATES PATENT OFFICE.

WILLIAM POMMERENKE, OF PAINTED WOOD CITY, DAKOTA TERRITORY.

COMBINED HARROW AND SEED-PLANTER.

SPECIFICATION forming part of Letters Patent No. 337,991, dated March 16, 1886.

Application filed April 16, 1885. Serial No. 162,593. (No model.)

*To all whom it may concern:*

Be it known that I, WILLIAM POMMERENKE, a citizen of the United States, residing at Painted Wood City, in the county of Burleigh, Territory of Dakota, have invented certain new and useful Improvements in a Combined Harrow and Seed-Planter, of which the following is a specification, reference being had therein to the accompanying drawings.

My invention relates to an apparatus which may be employed for planting seed and harrowing the soil at the same time, or used as a seed-planter or as a harrow separately and independently of each other.

The invention consists in a novel construction, arrangement, and combination of the various parts of the machine, whereby several advantages are obtained, as hereinafter more particularly described.

In the accompanying drawings, Figure 1 represents a top view of a machine embodying my improvements. Fig. 2 is an elevation of the rake part of the machine. Fig. 3 is a vertical section taken in the line Y Y, Fig. 1. Fig. 4 is a bottom view of the parts carried by the front axle-tree. Fig. 5 is a vertical section taken in the line Z Z of Fig. 1.

A represents the front axle-tree, which is provided with two permanent wheels, $a\ a$, a tongue or pole, $a^2$, a fifth-wheel, $a^3$, and two seats, $a^4\ a^4$.

To the front of the axle-tree A are attached two sets or series of seed-hoppers, B, having holes in their bottoms. Beneath these holes are a corresponding number of bucket-wheels, $c$, carried by a horizontal shaft, C, which has its bearings in hangers attached to the ends of the set or series of the hoppers.

At one end of the shaft C is a pulley, $c^2$, around which passes a band from a pulley on one of the wheels $a$, so that when the machine is in motion the bucket-wheels are rotated, and clogging of the seed at the bottom of the hoppers is prevented.

Between the stirrers $c$ and the holes in the bottoms of the hoppers are two semi-cylindrical plates, D D, arranged to slide horizontally above said bucket-wheels. Each plate is of a length sufficient to cover one-half of the number of stirrers, and each has a number of holes corresponding in size and location with the holes in the bottoms of the hoppers. To each of these plates is pivoted a horizontal lever, E, the front end of which is pivoted in front of the hoppers. By oscillating either one of these levers the plate to which it is pivoted is caused to slide longitudinally, so as to partially or entirely cut off the flow of seed through the holes in the bottoms of the hoppers, or to allow it to flow freely, as may be desired.

In order to provide for oscillating both levers simultaneously, their rear ends are pivoted to a horizontal bar, G, provided with a slot, $f$, with which engages the short arm or lower end of a vertical lever, H, which is pivoted in the rear of the hoppers, so that its long arm or upper end is within reach of the occupant of either of the seats $a^4$.

By disengaging one of the levers E from the bar G the plate to which it is connected may be left stationary and in position to close the holes in the bottoms of the hoppers, so as to allow only one-half of them to be used.

The plates D may be held stationary in any desired position, so as to partially or entirely close the holes in the bottoms of the hoppers, by securing the lever H in the desired position by means of a pin passed through a hole in the lever and through one of a series of holes in a plate, V, extending upward in rear of the hoppers.

To the front axle-tree is connected, by a king-bolt, $i$, the front end of a reach, J, the rear end of which is rigidly attached to the rear axle-tree, K. The reach is also connected to the fifth-wheel $a^3$ by a bolt, $l$, passing through both, so as to hold the reach rigidly in a right line with the pole $a^2$. When the machine is to be turned from a straight line, the bolt $l$ is removed.

To the ends of the rear axle-tree, K, are attached two rotary harrows. Each harrow consists of a wheel-shaped frame, L, composed of a circular rim and radial spokes diverging from a central hub, with the harrow-teeth extending downward from said rim and spokes. The hub is arranged to rotate on the lower end of a bar, M, which thus constitutes the axle, and which is attached to the axle-tree by a bolt, $m$, passing through both the axle-tree and the bar. The upper portion of the bar extends upward beyond the axle-tree, and is provided with a hole corresponding with a similar one in the axle-tree.

When used as a harrow, the harrow-frames L are horizontal, as shown in Fig. 1, and the bars M swing easily from the axle-tree, so as to allow the harrows to adjust themselves to the ground.

When it is desired to use the machine without harrowing the ground, the frames L are swung to a vertical position, as shown in Fig. 2 and in dotted lines in Fig. 1, and secured in that position by bolts $n$, passed through the axle-tree K and the bars M and secured by nuts. The frames thus become the rear wheels of the machine, which may then be used or transported from place to place without harrowing the ground. It is obvious that this arrangement could also be applied to a front axle where four harrow frames or wheels were desired.

To the rear axle-tree, K, are attached two downwardly-extending posts, P, each of which carries at its lower end a friction-wheel, Q. These wheels bear on the upper surfaces of the rims of the frames L, and by their friction impart a rotary motion to the harrows when the machine is in use.

To the rear end of the reach J, beyond the rear axle-tree, is pivoted a bent lever, R, the short arm of which extends rearward and downward and carries a wheel, S, and the long arm extends forward within reach of the occupants of the seats.

When the machine is to be turned from a straight line, the bolt $l$ is removed, as before described, and the lever R is raised, so as to raise the harrows from the ground and allow the machine to turn on the wheel S as a pivot.

The lever R also carries a rake, T, which works in a line extending back from the space between the harrow-frames, and thus insures the thorough harrowing of the ground.

What I claim as new, and desire to secure by Letters Patent, is—

1. In a combined seeder and harrow, constructed as described, the combination, with the front axle-tree, A, and rear axle-tree, K, of the reach J, fifth-wheel $a^3$, king-bolt $i$ and auxiliary bolt $l$, and the pivoted bent lever R, and steering or pivot wheel S, whereby said rear axle-tree and parts carried thereby may be held rigidly in a right line with the line of draft, or the entire machine may be turned on the wheel S as a pivot, as herein shown and described.

2. The combination, with two sets of seed-hoppers, $B^2$, of the bucket-wheels $c$ and their shaft C, revolved by a band from one of the wheels of the machine, the sliding perforated plates D, arranged under the hoppers, for regulating the flow of the seed to the bucket-wheels, the levers E, connecting-bar G, lever H, and perforated stationary plate V, whereby both sets of hoppers may be used at once, or only one set may be used, as herein shown and described.

3. The combination, with the harrow-frames, the rear axle-tree, and the reach, of the rake T, carried by the bent lever R, substantially as herein described.

In testimony whereof I affix my signature in presence of two witneses.

WILLIAM POMMERENKE.

Witnesses:
 JOEL S. WEISER,
 C. E. HEIDEL.